(12) United States Patent
Pritchard et al.

(10) Patent No.: US 10,443,719 B2
(45) Date of Patent: Oct. 15, 2019

(54) ELECTRICALLY ACTUATED CVT SHEAVES

(71) Applicant: BorgWarner Inc., Auburn Hills, MI (US)

(72) Inventors: Larry A. Pritchard, Macomb, MI (US); Thomas J. Foster, Troy, MI (US)

(73) Assignee: BorgWarner Inc., Auburn Hills, MI (US)

( * ) Notice: Subject to any disclaimer, the term of this patent is extended or adjusted under 35 U.S.C. 154(b) by 305 days.

(21) Appl. No.: 15/448,918

(22) Filed: Mar. 3, 2017

(65) Prior Publication Data

US 2017/0261102 A1  Sep. 14, 2017

Related U.S. Application Data

(60) Provisional application No. 62/306,852, filed on Mar. 11, 2016.

(51) Int. Cl.

| F16H 63/06 | (2006.01) |
|---|---|
| F16H 9/18 | (2006.01) |
| F16H 25/24 | (2006.01) |
| F16H 61/662 | (2006.01) |
| F16H 9/26 | (2006.01) |
| F16H 3/62 | (2006.01) |
| F16H 25/22 | (2006.01) |
| F16H 37/02 | (2006.01) |
| F16H 25/20 | (2006.01) |

(52) U.S. Cl.
CPC ............. *F16H 63/062* (2013.01); *F16H 9/18* (2013.01); *F16H 9/26* (2013.01); *F16H 25/2454* (2013.01); *F16H 61/662* (2013.01); *F16H 3/62* (2013.01); *F16H 25/2252* (2013.01); *F16H 37/022* (2013.01); *F16H 2025/2087* (2013.01)

(58) Field of Classification Search
CPC .... F16H 55/56; F16H 63/067; F16H 25/2204; F16H 37/022; F16H 63/062
USPC ........................................................... 474/20
See application file for complete search history.

(56) References Cited

U.S. PATENT DOCUMENTS

| 1,881,028 | A | * | 10/1932 | Meyer | F16H 55/566 |
| | | | | | 116/DIG. 4 |
| 2,480,212 | A | * | 8/1949 | Baines | F16H 25/2204 |
| | | | | | 310/83 |
| 3,375,738 | A | * | 4/1968 | Love | A01D 41/12 |
| | | | | | 460/116 |
| 4,706,518 | A | * | 11/1987 | Moroto | F16H 3/66 |
| | | | | | 475/205 |
| 4,735,598 | A | * | 4/1988 | Moroto | F16H 63/067 |
| | | | | | 474/29 |
| 5,378,198 | A | * | 1/1995 | Moroto | F16H 63/062 |
| | | | | | 474/30 |
| 5,632,703 | A | * | 5/1997 | Wilkes | F16H 37/0846 |
| | | | | | 474/72 |

(Continued)

*Primary Examiner* — Henry Y Liu
(74) *Attorney, Agent, or Firm* — BrooksGroup

(57) ABSTRACT

A product may include a rotating sheave that may have a first sheave half and a second sheave half. A distance between the first and second sheave halves may be variable. A screw actuator may have a screw that may engage the first sheave half. A motor may be connected with the screw and may be operable to move the first sheave half to vary the distance through the screw.

14 Claims, 3 Drawing Sheets

(56) References Cited

U.S. PATENT DOCUMENTS

| | | | | |
|---|---|---|---|---|
| 5,766,105 | A * | 6/1998 | Fellows | F16H 61/6625 474/17 |
| 6,626,778 | B1 * | 9/2003 | Kapaan | F16H 55/56 474/20 |
| 6,689,000 | B1 * | 2/2004 | Kapaan | F16H 55/56 474/20 |
| 6,837,818 | B1 * | 1/2005 | Kapaan | B60W 10/02 475/210 |
| 7,004,860 | B2 * | 2/2006 | Yoshida | F16H 25/2214 474/17 |
| 7,066,860 | B2 * | 6/2006 | Habuchi | F16H 37/027 475/208 |
| 7,556,576 | B2 * | 7/2009 | Mochizuki | F16H 9/18 474/18 |
| 7,980,973 | B1 * | 7/2011 | Starkey | F16H 63/062 474/18 |
| 8,221,283 | B2 * | 7/2012 | Frank | F16D 1/108 475/331 |
| 2002/0183146 | A1 * | 12/2002 | Yoshida | F16H 25/2214 474/23 |
| 2004/0014547 | A1 * | 1/2004 | Habuchi | F16H 37/027 475/210 |
| 2007/0054763 | A1 * | 3/2007 | Mochizuki | F16H 9/18 474/18 |
| 2016/0221555 | A1 * | 8/2016 | Rehfus | B60T 7/12 |
| 2017/0030445 | A1 * | 2/2017 | Weh | B60T 13/745 |

* cited by examiner

ELECTRICALLY ACTUATED CVT SHEAVES

CROSS-REFERENCE TO RELATED APPLICATIONS

This application claims the benefit of U.S. Provisional Application Ser. No. 62/306,852 filed Mar. 11, 2016.

TECHNICAL FIELD

The field to which the disclosure generally relates includes electrically actuated devices, and in particular includes electrically actuated sheaves in continuously variable transmissions (CVTs).

BACKGROUND

A CVT may be used to continuously vary the gear ratios between an input shaft and an output shaft. The driveline of a vehicle may include a CVT between the engine and the drive wheels to provide a range of relative speeds between the input and output shafts.

SUMMARY OF ILLUSTRATIVE VARIATIONS

A number of illustrative variations may involve a product that may include a rotating sheave that may have a first sheave half and a second sheave half. A distance between the first and second sheave halves may be variable. A screw actuator may have a screw that may engage the first sheave half. A motor may be connected with the screw and may be operable to move the first sheave half to vary the distance through the screw.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
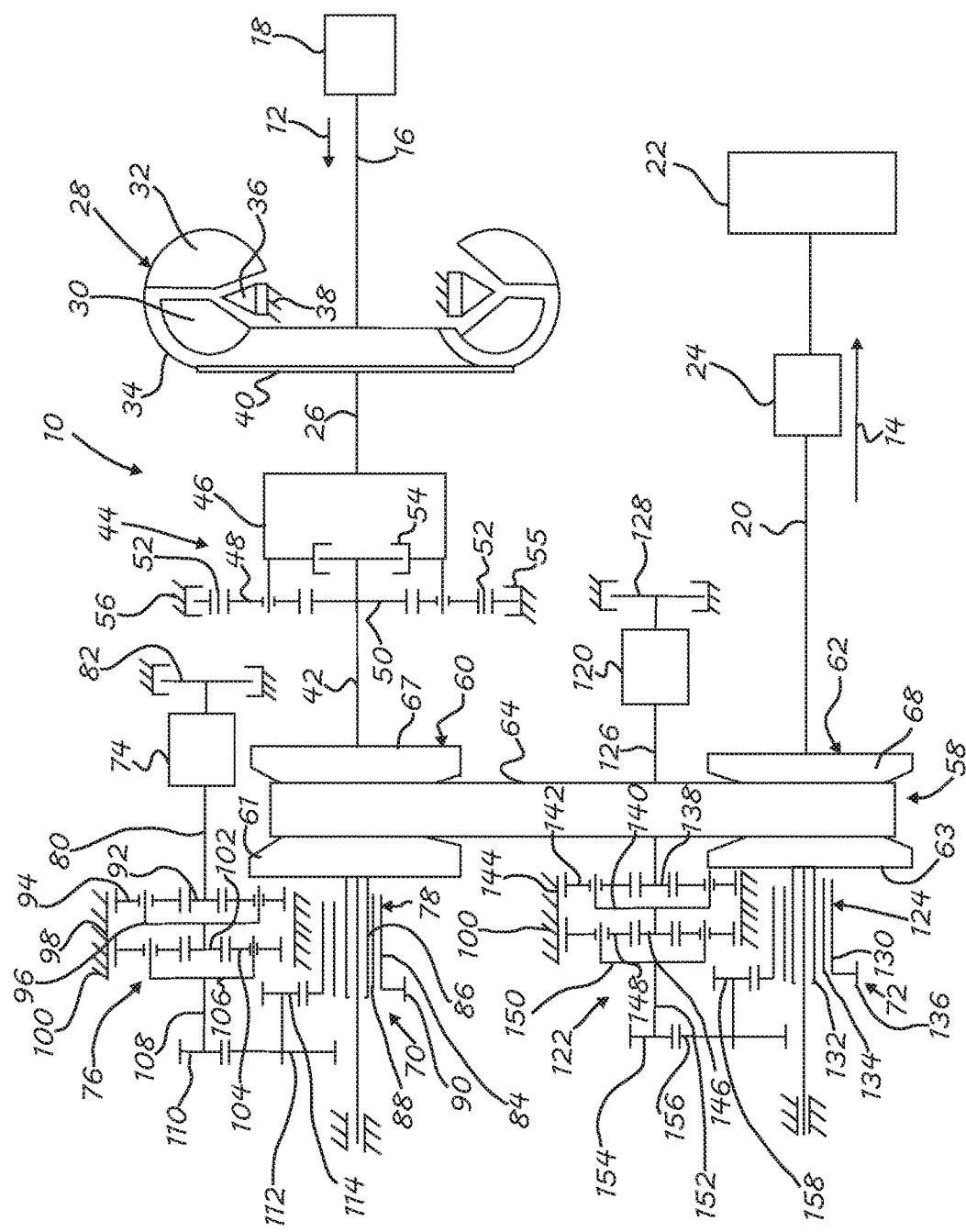
FIG. 1 is a schematic illustration of a product according to a number of variations.

In a number of variations as illustrated in FIG. 1, a product 10 may include an input operation 12 and an output operation 14. The input operation 12 may be in the form of a rotationally driven shaft 16. The shaft 16 may be connected with a power plant 18, which may be an engine, such as an internal combustion engine, or may be an alternative power plant, or a hybrid arrangement. The output operation 14 may be in the form of a rotationally driving shaft 20. The shaft 20 may be connected to, and may drive, one or more road wheels 22 through a gear mechanism 24. The gear mechanism 24 may include a differential unit to split torque and may include addition gearing to transfer motion to the road wheel 22. The road wheel 22 may require a range of speed inputs from the shaft 20, and may operate under a variety of conditions with varying torque requirements. As a result, the power plant 18 may operate over a range of rotational speeds and the product 10 may provide various gear ratios between the shafts 16 and 20.

In a number of variations the shaft 16 may be connected with a torque transfer element 26 through a coupling 28. The torque transfer element 26 may supply driving input to a downstream load which may include the road wheel 22. When the power plant 18 includes an internal combustion engine, the coupling 28 may be a torque converter type fluid coupling. The shaft 16 may be connected with an impeller 30. The torque transfer element 26 may be connected with a turbine 32 through a housing section 34. A stator 36 may be positioned between the impeller 30 and the turbine 32 and may affect power transfer through the coupling 28 from the shaft 16 to the torque transfer element 26. The stator 36 may be grounded at a case 38. Rotation of the impeller 30 may act through a fluid in the coupling 28 to rotate the turbine 32 so that the torque transfer element 26 is driven by the shaft 16. The coupling 32 may allow the impeller 30 to rotate relative to the turbine 32, and the stator 36 may effect torque multiplication between the impeller 30 and the turbine 32. A lockup clutch 40 may be provided to lock the impeller 30 with the turbine 32 through the housing 34 so that the two rotate together.

In a number of variations the torque transfer element 26 may be connected with a shaft 42 through a drive-reverse unit 44, which may effect a number of operational modes. The operational modes may include neutral, forward and reverse operation. The torque transfer element 26 may be connected with, or formed as part of, a carrier 46. The carrier 46 may carry a number of planet gears 48 in a spaced apart state. The planet gears 48 may mesh with external teeth on a sun gear 50 and may mesh with internal teeth on a ring gear 52. A forward clutch 54 may be connected between the carrier 46 and the sun gear 50. The forward clutch 54 may be a friction plate type wet clutch which may include a number of inner plates fixed to rotate with one of the carrier 46 or the sun gear 54, and a number of interlayered outer plates fixed to rotate with the other one of the carrier 46 or the sun gear 54. An actuator (not shown), may selectively effect compression of the inner and outer plates so that they rotate together and may drive the sun gear 54 from the carrier 46 to provide the forward drive mode, with the ring gear 52 free to spin. A reverse clutch 55 may be a friction plate type wet clutch which may include a number of plates fixed to rotate with the ring gear 52, and a number of interlayered plates fixed to the case 56. An actuator (not shown), may selectively effect compression of the plates so that the ring gear 52 becomes grounded to the case 56 to reverse rotation of the sun gear 50 as driven by the carrier 46 through the planet gears 48, providing the reverse drive mode. In the forward drive mode the reverse clutch 55 may be open or disengaged, and in the reverse drive mode the forward clutch 54 may be open or disengaged. Both clutches 54, 55 may be opened to provide a neutral mode.

In a number of variations the shaft 42 may be connected with a variator unit 58, at a drive sheave 60. The power unit 18 may drive the sheave 60 through the shaft 42. The drive sheave 60 may be connected with a driven sheave 62 by a linking member 64 which may be a belt or chain that may encircle the sheaves 60, 62. The drive and driven sheaves 60, 62 may each be in the form of a pulley which has an adjustable operating diameter for use with the linking member 64. The left (as viewed in FIG. 1), halves 61, 63 and the right (as viewed in FIG. 1), halves 67, 68 of the sheaves 60, 62 may be moved closer together or further apart to vary the operating diameter of the sheaves 60, 62. Changing the distance between the two halves 61 and 67 on one hand, and 63 and 68 on another hand, results in the linking member 64 riding higher or lower in its respective groove of the pulleys 60, 62. This may change the effective drive ratio between the drive pulley 60 and the driven pulley 62. One or more actuator units 70 and/or 72 may be provided in the variator unit 58 to effect movement of the pulley halves 61 and 67 relative to one another, and/or to effect movement of the pulley halves 63 and 68 relative to one another. The actuator units 70 and/or 72 may be of a planetary roller screw type actuator. An electronic controller (not shown), may control the operation of the actuator units 70 and/or 72 in a preprogrammed manner in response to operating conditions.

In a number of variations the actuator unit 70 may generally include a motor 74, a gear reduction unit 76 and a screw actuator unit 78. The motor 74 may provide a relatively high power to volume ratio and as such, may be a brushless DC motor, or another type. The motor 74 may drive a shaft 80 that may be connected with a brake 82. The brake 82 may be an electromagnetic friction brake and may be normally closed to hold the shaft 80 from rotation when power is not supplied to the brake 82. The brake 82, by normally holding the shaft 80, may fix the sheave half 61 in position relative to the sheave half 67. This may reduce the duty cycle on the motor 74, and may maximize efficiency of the product 10 by minimizing power consumption in non-transient vehicle maneuvers. The screw actuator unit 78 may be planetary roller screw type unit that may include a nut 84, a screw 86 and a number of planet rollers 88 positioned between the nut 84 and the screw 86. The planet rollers 88 may include threads that mesh with threads on each of the nut 84 and the screw 86. Rotation of the nut 84 may rotate the planet rollers 88 which in-turn, may cause the screw 86 to translate linearly. The screw 86 may be hollow and the shaft 42 may extend completely through its hollow center. The screw 86 may be engaged with the pulley half 61 to alternatively drive it toward and away from the pulley half 67. The nut 84 may include an external gear 90 that may be engaged with, and driven by, the gear reduction unit 76.

In a number of variations the gear reduction unit 76 may effect reduced rotational speed and increased torque between the shaft 80 and the nut 86. The shaft 80 may provide input into a dual reduction planetary arrangement at a first stage thereof, through a sun gear 92. The sun gear 92 may mesh with a number of planet gears 94 carried by a carrier 96. The planet gears 94 may mesh with a ring gear 98 that may be fixed to a housing 100. The ring gear may extend over both of the first and second stages of the planetary arrangement. The carrier 96 may be fixedly connected with a sun gear 102 providing input to the second stage. The sun gear 102 may mesh with a number of planet gears 104 carried by a carrier 106. The planet gears 104 may mesh with the ring gear 98. The carrier 106 may be fixedly connected with a torque transfer element 108 that may provide output from the dual reduction planetary arrangement. Input from the shaft 80 may be communicated, in order, through the sun gear 92, the planet gears 94, the carrier 96, the sun gear 102, the planet gears 104, and the carrier 106 to the torque transfer element 108. With the ring gear 98 fixed, rotational speed may be reduced through two stages and torque may be multiplied through the two stages of the dual reduction planetary arrangement.

In a number of variations the torque transfer element 108 may be a fixed connection, or an integral structure between the carrier 108 and a gear 110. The gear 110 may mesh with and may drive a gear 112. The gear 112 may have a larger diameter and a greater number of teeth than the gear 110 to provide a speed reduction. The gear 112 may be connected with, or may be integrally formed with, a gear 114. The gear 114 may mesh with and may drive the external gear 90 on the nut 84. The external gear 90 may have a larger diameter and a greater number of teeth than the gear 114 to provide a speed reduction. The motor 74 may be reversible and may effect linear translation of the sheave half 61 through the gear reduction unit 76, the screw actuator unit 78, and the number of intermediary gears.

In a number of variations the sheave half 63 may similarly be driven by an actuator unit 72. The sheave 61 may be varied by an interconnected motor 120 in the actuator unit 72. In a number of variations the actuator unit 72 may generally include the motor 120, a gear reduction unit 122 and a screw actuator unit 124. The motor 120 may provide a relatively high power to volume ratio and as such, may be a brushless DC motor. The motor 120 may drive a shaft 126 that may be connected with a brake unit 128. The brake unit 128 may be an electromagnetic friction brake and may be normally closed to hold the shaft 126 from rotation when power is not supplied to the brake unit 128. The screw actuator unit 124 may be planetary roller screw type unit that may include a nut 130, a screw 132 and a number of planet rollers 134 positioned between the nut 130 and the screw 132. The planet rollers 134 may include threads that mesh with threads on each of the nut 130 and the screw 132. Rotation of the nut 130 may rotate the planet rollers 134 which in-turn, may cause the screw 132 to translate linearly. The screw 132 may be hollow and the shaft 20 may extend completely through its hollow center. The screw 132 may be engaged with the sheave half 63 to alternatively drive it toward and away from the sheave half 68. The nut 130 may include an external gear 136 that may be engaged with and driven by the gear reduction unit 122.

In a number of variations the gear reduction unit 122 may effect reduced rotational speed and increased torque between the shaft 126 and the nut 130. The shaft 126 may provide input into a dual reduction planetary arrangement at a first stage thereof, through a sun gear 138. The sun gear 138 may mesh with a number of planet gears 142 carried by a carrier 140. The planet gears 142 may mesh with a ring gear 144 that may be fixed to the housing 100. The ring gear 144 may extend over both of the first and second stages of the planetary arrangement. The carrier 140 may be fixedly connected with a sun gear 146 providing input to the second stage. The sun gear 146 may mesh with a number of planet gears 148 carried by a carrier 150. The planet gears 148 may mesh with the ring gear 144. The carrier 150 may be fixedly connected with a torque transfer element 152 that may provide output from the dual reduction planetary arrangement. Input from the shaft 126 may be communicated, in order, through the sun gear 138, the planet gears 142, the carrier 140, the sun gear 146, the planet gears 148, and the carrier 150 to the torque transfer element 152. With the ring gear 144 fixed, speed may be reduced through two stages, and torque may be multiplied through two stages of the dual reduction planetary arrangement.

In a number of variations the torque transfer element 152 may be a fixed connection, or may be an integral structure, between the carrier 150 and a gear 154. The gear 154 may mesh with and may drive a gear 156. The gear 156 may have a larger diameter and a greater number of teeth than the gear 154 to provide a speed reduction. The gear 156 may be connected with, or integrally formed with, a gear 158. The gear 158 may mesh with and may drive the external gear 136 on the nut 130. The external gear 136 may have a larger diameter and a greater number of teeth than the gear 158 to provide a speed reduction. The motor 120 may be reversible and may effect linear translation of the sheave half 63 through the gear reduction unit 122, the screw actuator unit 124, and the number of intermediary gears.

Figure 2:
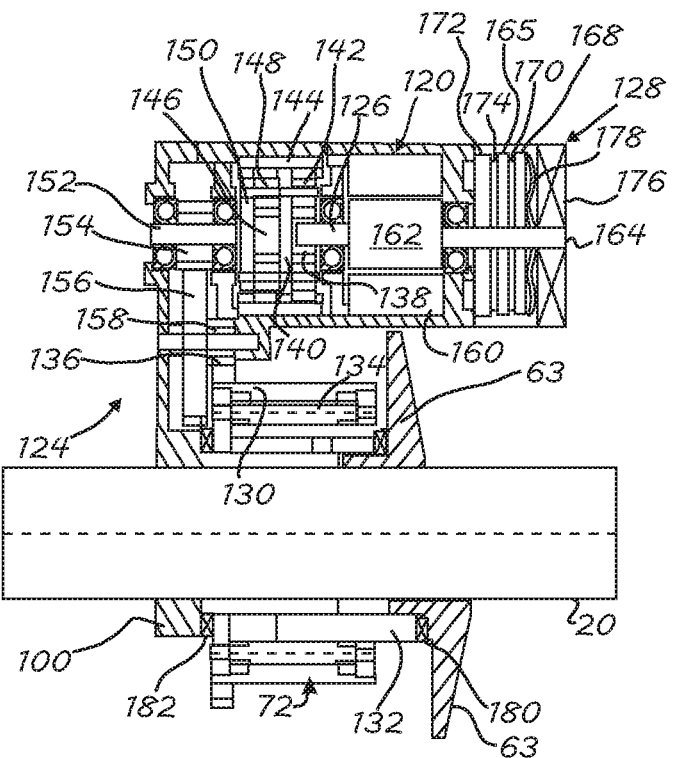
FIG. 2 is a schematic illustration of part of a product according to a number of variations.

With reference to FIG. 2, the screw actuator unit 124 is illustrated according to a number of variations. The motor 120 may include a stator 160 and a rotor 162 that may be connected with the shaft 126. The shaft 126 may extend out both ends of the rotor 162. The brake unit 128 may be connected to one end 164 of the shaft 126 with a disc 165 fixed to rotate with the shaft 126. A pressure plate 168 may be disposed adjacent the disc 165 with a friction material 170 disposed between the pressure plate 168 and the disc 165. A backing plate 172 may be positioned on a side of the disc 165, opposite the pressure plate 168. A friction material 174 may be disposed between the backing plate 172 and the disc 165. A spring plate 178 may be positioned against the pressure plate 168 and may normally compress the disc 165 between the pressure plate 168 and the backing plate 172, through the friction material 170, 174 to hold the shaft 126 from rotating. A coil 176 may be positioned adjacent the pressure plate 168 and may be energized to compress the spring plate 178 by pulling the pressure plate 168 to release the disc 174 to allow the shaft 126 to rotate.

Figure 3:
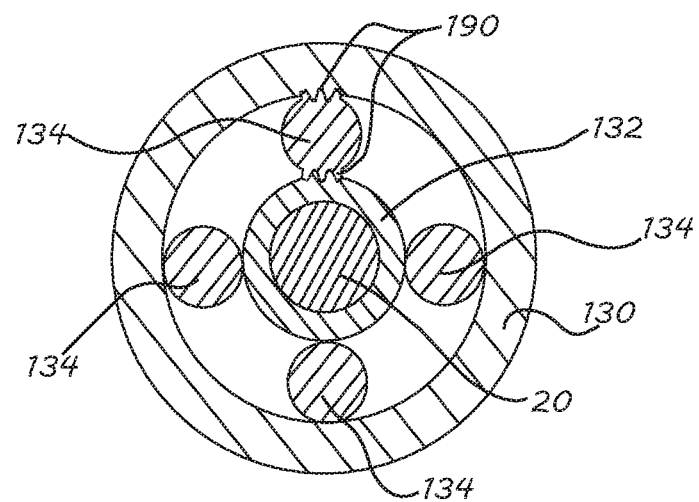
FIG. 3 is a schematic illustration of part of a product according to a number of variations.

The screw actuator unit 124 may include the nut 130, the screw 132 and the planet rollers 134. The sheave half 63 may be supported on the shaft 20, and the sheave half 63 may translate along a length of the shaft 20. The sheave half 63 and the shaft 20 may include a key and groove connection to allow the translation but to inhibit relative rotation. The screw 132 may be hollow and the shaft 20 may extend completely through its hollow center. The screw 132 may operate bi-directionally on the sheave half 63 through thrust washers 180 and against the housing 100 through a thrust washer 182. To illustrate translation, the sheave half 63 is illustrated in a first position at the top of the shaft 20 and a second position at the bottom of the shaft 20, with the screw 132 extended to the right. It will be understood that the sheave half 63 may be of an annular shape and its upper and lower parts will move together in an aligned relation. The nut 130 and the planet rollers 134 may be carried on the housing 100 so that they may rotate but may not translate with the screw 132. The sheave half 63 may be translated linearly in opposite directions from the sheave half 68, when driven in order, through the sun gear 138, the planet gears 142, the carrier 140, the sun gear 146, the planet gears 148, the carrier 150, the torque transfer element 152, the gears 154, 156, and 158, the nut 130, the planet rollers 134, and the screw 132. With reference to FIG. 3, which illustrates a section through the actuator unit 72, the screw 132 may be surrounded by the nut 130, and the planet rollers 134 may be carried between the two. The planet rollers 134 may be distributed around the circumference of the screw 132 and may be spaced evenly, the meshing surfaces of the screw 132, the planet rollers 134 and the nut 130 may all have meshing gear teeth, a portion 190 of which is shown.

Figure 4:
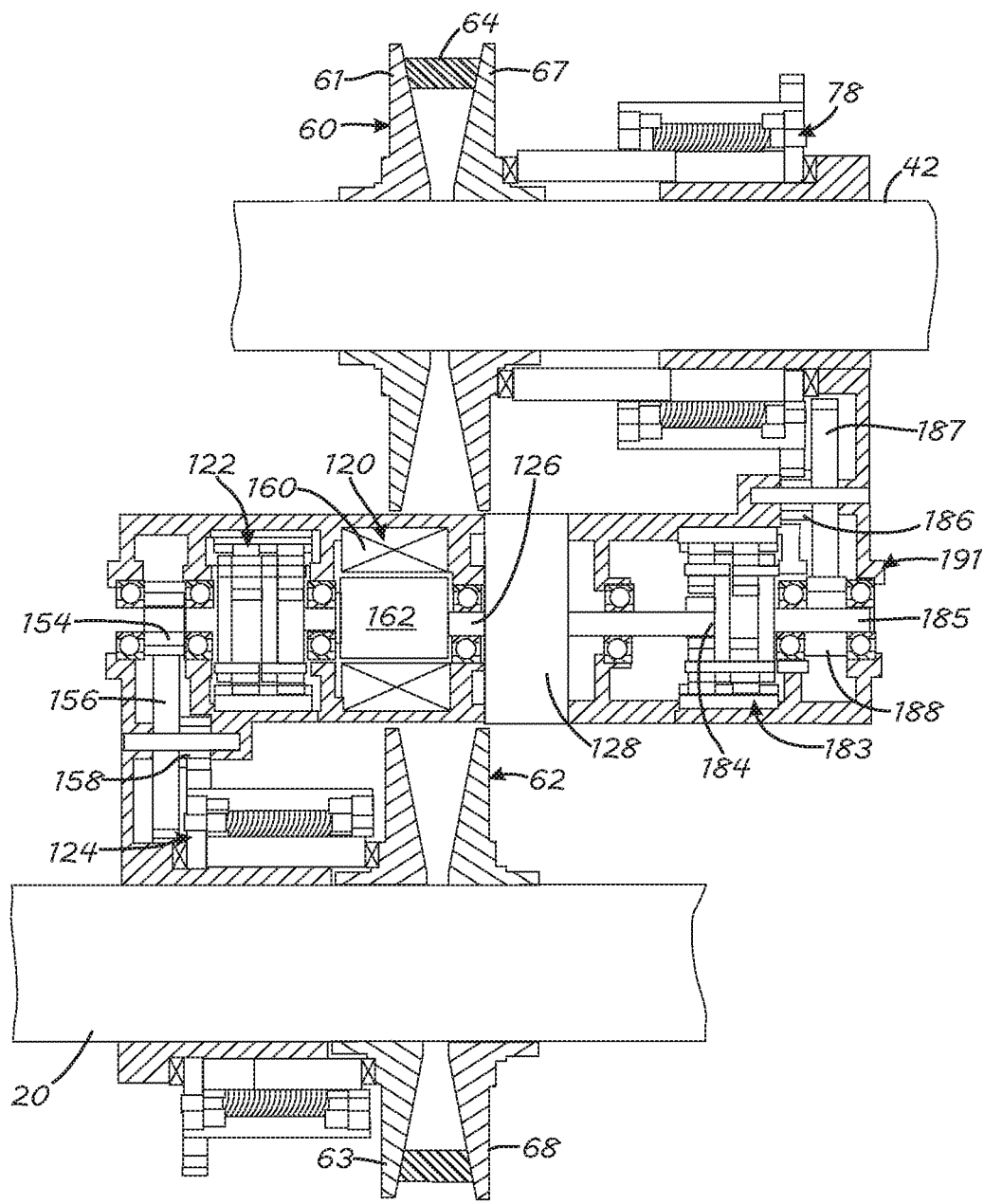
FIG. 4 is a schematic illustration of a product according to a number of variations.

In a number of variations as illustrated in FIG. 4, both the drive sheave 60 and the driven sheave 62 may be varied with power supplied from a common motor. For example the sheave half 63 may be driven by the motor 120 through the gear reduction unit 122, the gears 154, 156, 158, and the screw actuator unit 124. The shaft 126 of the motor 120 may be extended through the brake unit 128, and may be connected with a gear reduction unit 183 at its end 184. The gear reduction unit 183 may be a double planetary gear reduction unit. Output from the gear reduction unit 183 may be provided by a shaft 185. The sheave half 67 may be driven by the screw actuator unit 78. The screw actuator unit 78 may be oriented to engage with the shaft 185 through gears 186, 187 and 188. Accordingly, the sheave half 67 may be driven by the motor 120 through the gear reduction unit 183, the gears 188, 187, 186 and the screw actuator unit 78. The motor 120 may drive variation of both the drive sheave 60 and the driven sheave 62. The housing 191 may provide the structure to support the components in the dual drive arrangement.

Through the variations described above, the sheaves of a CVT may be varied through a screw actuator. The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a product that may include a rotating sheave that may have a first sheave half and a second sheave half wherein a distance between the first and second sheave halves may be variable. A screw actuator may have a screw that may engage the first sheave half. A motor may be connected with the screw and may be operable to move the first sheave half to vary the distance through the screw.

Variation 2 may include a product according to variation 1 wherein the screw actuator may include a planet roller that may mesh with the screw. A nut may mesh with the planet roller. The motor may drive the nut to rotate the planet roller which may move the screw linearly.

Variation 3 may include a product according to variation 2 and may include a planetary gear set that may have a sun gear. A planet gear may mesh with the sun gear. A ring gear may mesh with the planet gear. The planetary gear set may be connected between the motor and the nut and may provide a gear reduction from the motor to the nut.

Variation 4 may include a product according to variation 3 wherein the motor may include a rotor with a shaft that may be connected with the planetary gear set and with a brake. The brake may engage the shaft and may hold the shaft from rotating, and may fix the first sheave half in place.

Variation 5 may include a product according to any of variations 1-4 and may include a road wheel that may be driven by the sheave.

Variation 6 may include a product according to any of variations 1-5 and may include a power unit and a drive-reverse unit that may be configured to reverse rotation of the sheave. The power unit may drive the sheave to rotate through the drive-reverse unit.

Variation 7 may include a product according to any of variations 1-6 wherein the screw actuator may include a number of planet rollers that may mesh with the screw. A nut may mesh with, and may surround, the number of planet rollers. The nut may have an internal gear that may mesh with the number of planet rollers and may have an external gear that may be driven by the motor.

Variation 8 may include a product according to any of variations 1-7 wherein the sheave may rotate on a shaft. The screw may have a hollow center. The shaft may extend through the hollow center of the screw.

Variation 9 may involve a product that may include a first sheave. A second sheave may be drivingly connected to the first sheave by a linking member. At least one of the first or second sheaves may have a first sheave half and an opposed second sheave half, and may have a variable operating diameter effected by movement of the first sheave half relative to the second sheave half. A screw actuator may have a screw that may engage the first sheave half. A motor may be engaged with the screw through a drive line that may effect translation of the screw.

Variation 10 may include a product according to variation 9 and may include a planet roller that may mesh with the screw. A nut may mesh with the planet roller. The motor may be connected with the screw through the nut and the planet roller.

Variation 11 may include a product according to variation 10 and may include a dual reduction planetary gear set that may be connected between the motor and the nut.

Variation 12 may include a product according to variation 11 wherein the motor may include a rotor with a shaft that may be connected with the dual reduction planetary gear set. A brake may engage the shaft, and may hold the shaft from rotating, and may fixing the first sheave half in place.

Variation 13 may include a product according to any of variations 10-12 and may include a power unit. A drive-reverse unit may have a planetary gears set. The power unit may drive the first sheave through the drive-reverse unit.

Variation 14 may include a product according to any of variations 10-13 and may include a power unit and a torque converter. The power unit may drive the first sheave through the torque converter.

Variation 15 may include a product according to variation 14 and may include a drive wheel and a gear mechanism. The second sheave may be connected with the drive wheel through the gear mechanism.

The above description of select variations within the scope of the invention is merely illustrative in nature and, thus, variations or variants thereof are not to be regarded as a departure from the spirit and scope of the invention.

What is claimed is:

1. A product comprising a rotating sheave that has a first sheave half and a second sheave half wherein a distance between the first and second sheave halves is variable, a screw actuator that has a screw engaging the first sheave half, and a motor connected with the screw and operable to move the first sheave half to vary the distance through the screw;
   wherein the screw actuator comprises a planet roller meshing with the screw and a nut meshing with the planet roller wherein the motor drives the nut to rotate the planet roller which moves the screw linearly;
   a planetary gear set that has a sun gear, a planet gear meshing with the sun gear and a ring gear meshing with the planet gear, the planetary gear set connected between the motor and the nut and providing a gear reduction from the motor to the nut; and
   wherein the motor includes a rotor with a shaft that is connected with the planetary gear set and with a brake, the brake disposed on the shaft and engaging the shaft to hold the shaft from rotating and fixing the first sheave half in place.

2. The product according to claim 1 further comprising a road wheel driven by the sheave.

3. The product according to claim 1 further comprising a power unit and a drive-reverse unit that is configured to reverse rotation of the sheave, the power unit driving the sheave to rotate through the drive-reverse unit.

4. The product according to claim 1 wherein the screw actuator comprises a number of planet rollers meshing with the screw and a nut meshing with, and surrounding, the number of planet rollers, wherein the nut has an internal gear meshing with the number of planet rollers and an external gear driven by the motor.

5. The product according to claim 1 wherein the sheave rotates on a shaft and wherein the screw has a hollow center with the shaft extending through the hollow center of the screw.

6. The product according to claim 1 wherein the brake is an electromagnetic friction brake.

7. The product according to claim 1 wherein the shaft extends out of both ends of the rotor, and wherein the brake is connected to one end of the shaft and the sun gear of the planetary gear set is attached to a second end of the shaft.

8. A product comprising a first sheave, a second sheave drivingly connected to the first sheave by a linking member, at least one of the first or second sheaves has a first sheave half and an opposed second sheave half, and has a variable operating diameter effected by movement of the first sheave half relative to the second sheave half a screw actuator that has a screw engaging the first sheave half a motor engaged with the screw through a drive line that effects translation of the screw; a planet roller meshing with the screw and a nut meshing with the planet roller, wherein the motor is connected with the screw through the nut and the planet roller; a dual reduction planetary gear set connected between the motor and the nut; and wherein the motor includes a rotor with a shaft that is connected with the dual reduction planetary gear set, and comprising a brake disposed on the shaft and engaging the shaft to hold the shaft from rotating and fixing the first sheave half in place.

9. The product according to claim 8 further comprising a power unit and a drive-reverse unit that has a planetary gears set, the power unit driving the first sheave through the drive-reverse unit.

10. The product according to claim 8 further comprising a power unit and a torque converter, the power unit driving the first sheave through the torque converter.

11. The product according to claim 10 further comprising a drive wheel and a gear mechanism, the second sheave connected with the drive wheel through the gear mechanism.

12. The product according to claim 8 wherein the brake is an electromagnetic friction brake.

13. A product comprising:
   a motor having a shaft extending from each end of the motor;
   a brake operatively attached to a first end of the shaft constructed and arranged to hold the shaft from rotation when power is not supplied to the brake;
   a dual reduction planetary gear set operatively connected to a second end of the shaft;
   a screw actuator unit operatively attached to the dual reduction planetary gear set; and
   a rotating sheave having a first sheave half and a second sheave half, wherein the first sheave half is operatively attached to and driven by the screw actuator unit to vary the distance between the first sheave half and the second sheave half.

14. The product according to claim 13 wherein the brake is an electromagnetic friction brake.

\* \* \* \* \*